United States Patent
Wang

(10) Patent No.: US 7,388,989 B2
(45) Date of Patent: Jun. 17, 2008

(54) METHOD FOR RUN-TIME STREAK DETECTION BY PROFILE ANALYSIS

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 634 days.

(21) Appl. No.: 10/992,865

(22) Filed: Nov. 19, 2004

(65) Prior Publication Data

US 2006/0109522 A1    May 25, 2006

(51) Int. Cl.
G06K 9/40    (2006.01)
G06K 9/48    (2006.01)
G06K 15/00    (2006.01)
G06T 5/00    (2006.01)
H04N 1/407    (2006.01)
H04N 1/409    (2006.01)

(52) U.S. Cl. .................. 382/199; 382/275; 358/3.26

(58) Field of Classification Search ................ 382/275, 382/300, 318, 190, 192–194, 199, 274, 202, 382/203

See application file for complete search history.

(56) References Cited

U.S. PATENT DOCUMENTS 6,728,418 B1 *    4/2004    Kumagai et al. ........... 382/275
7,058,236 B2 *    6/2006    Ohashi ....................... 382/275

OTHER PUBLICATIONS

U.S. Appl. No. 10/845,145, filed May 14, 2004 to S. Schweid, et al. for "Systems and Methods for Streak Detection in Image Array Scanning Overdetermined Scanners and Column Filtering".

* cited by examiner

*Primary Examiner*—Matthew C. Bella
*Assistant Examiner*—Wesley Tucker
(74) *Attorney, Agent, or Firm*—Jeannette Walder

(57) ABSTRACT

Disclosed is a method to detect streaks in the scanned documents. The principle of this method is that the profiles of streaks change very little from line to line, while profiles of other thin lines, as content of scanned documents, usually vary in a degree. Therefore, each scan-line can be searched for streak profiles. Once such a profile is detected, it is compared with a profile stored in a buffer, which represents a dynamic average of previously recorded scan-lines. If a stable streak profile is detected and lasted for a certain length, say one inch, the streak alarm can be turned on and a corresponding correction process can be applied for streak removal. With a limited buffer increase and without any major hardware modification, the proposed method can detect occurrence of streaks at run time of the scanning process.

5 Claims, 3 Drawing Sheets

FIG. 5
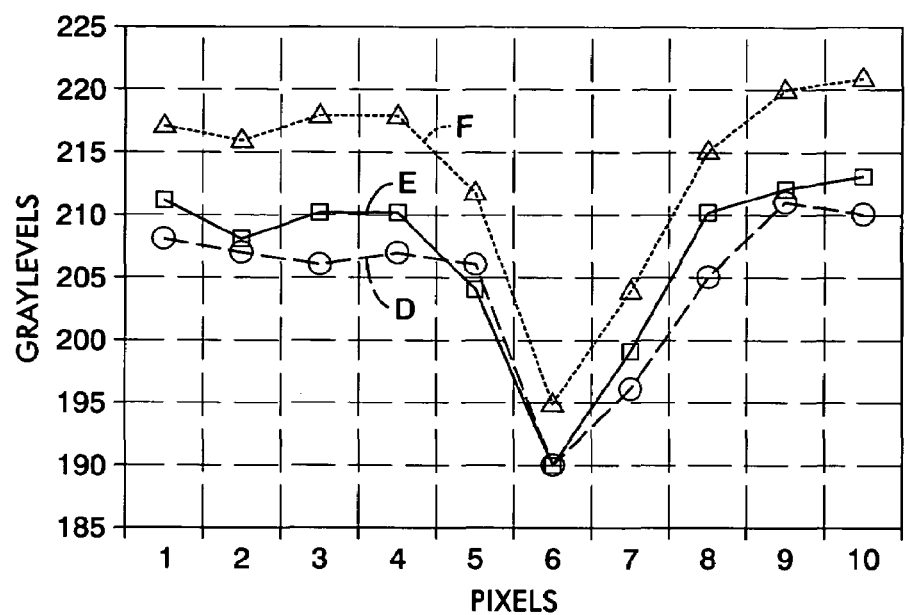
FIG. 6

METHOD FOR RUN-TIME STREAK DETECTION BY PROFILE ANALYSIS

CROSS-REFERENCE TO RELATED APPLICATIONS

This application is related to co-assigned U.S. patent application Ser. No. 10/993,852 to S. Wang et al. for Method for Run-Time Streak Removal, filed Nov. 19, 2004, the same date hereof (20031611-US-NP), the contents of which are incorporated herein in its entirety and made a part hereof. This application is also related to co-pending, co-assigned U.S. patent application Ser. No. 10/845,146 filed May 14, 2004 to S. Schweid et al. for Systems and Methods for Streak Detection in Image Array Scanning Overdetermined Scanners and Column Filtering (D/A3408), the contents of which are incorporated herein in its entirety and made a part hereof.

BACKGROUND

This disclosure relates generally to methods for run-time detection of streaks produced in scanned images.

A main drawback of paper-fed scanners, such as CVT (Constant Velocity Transfer) scanners, is their vulnerability to streak defects. Because the sensors equipped in such scanners are open to the environment, extraneous dirt, such as paper fibers, may cover or partially cover some of the sensor elements and stick there for a short time or as long as scanning several pages. As a result, streak defects, formed as straight thin lines, will appear on the images of scanned documents in various lengths. Some mechanical methods may be used to keep dirt off the sensor surface, but usually are not sufficient to completely eliminate all streaks.

Another method proposes the use redundant sensors for streak detection. For example, two identical sensor arrays can be spatially separated with a certain distance for a black and white (B/W) scanner and streaks can be determined by comparison of the outputs of two arrays. A method to use 4-row sensors to detect streaks for color scanners has been also been proposed in D/A3408. Obviously, methods using redundant sensors require new hardware designs and cost more money. Although it is not too difficult to detect scanner streaks by a post-scanning image processing, it is often not practical due to time or memory limitations. It would be desirable to have a method which does not require major modification of existing scanning mechanisms while providing sufficient run-time streak detection to prevent severe streaks, such as inches-long, dark lines appearing in images of scanned documents.

If a streak defect is detected in a scanned document, the next task is to replace it with "correct data". Replacing corrupted data involves guessing what the actual data should have been, based on neighboring data. The most common approach is linear interpolation and works very well for streak removal from images with smooth backgrounds. However, if the left and right neighborhoods of a streak have a textured background, such as found in halftone structures, linear interpolation does not provide a satisfactory result. 20031611-US-NP describes a method of run time streak removal that removes streaks from textured backgrounds with satisfactory results.

SUMMARY

Disclosed herein in embodiments is a method, which may be implemented in software or hardware, to detect streaks in the scanned documents. The principle of this method is that the profiles of streaks change very little from line to line, while profiles of other thin lines, as content of scanned documents, usually vary in a degree. Therefore, each scan-line can be searched for streak profiles. Once such a profile is detected, it is compared with a profile stored in a buffer, which represents a dynamic average of previously recorded scan-lines. If a stable streak profile is detected and lasted for a certain length, say one inch, the streak alarm can be turned on and a corresponding correction process can be applied for streak removal. With a limited buffer increase and without any major hardware modification, the proposed method can detect occurrence of streaks at run time of the scanning process.

A method for detecting a streak in a scanned image, in accordance with one embodiment, includes providing a scan line of image data from the scanned image; determining a scan line profile of the provided scan line, wherein a profile comprises a plot of scanned gray level versus pixel location on the scan line; comparing the scan line profile to a predetermined profile for a streak; if the scan line profile substantially matches the predetermined streak profile, a streak has been detected. The method may further include determining a buffer profile comprising a dynamic average of profiles determined for previously provided scan lines; comparing the scan line profile to the buffer profile; if the scan line profile substantially matches the buffer profile, a streak has been detected. The method may also include, for each subsequently provided scan line of image data from the scanned image: determining a scan line profile of the subsequently provided scan line; comparing the subsequently provided scan line profile to the predetermined profile for a streak; if the subsequently provided scan line profile substantially matches the predetermined streak profile, determining a buffer profile comprising a dynamic average of profiles determined for previously provided scan lines; comparing the subsequently provided scan line profile to the buffer profile; if the scan line profile substantially matches the buffer profile, for a predetermined number of scan lines, a streak has been detected.

Each scan line profile can be compared to a set of stored, predetermined streak profiles, which may include, for example, streak profile for dark streak on a light background and a streak profile for a light streak on a dark background.

A method for detecting a streak in a scanned image, according to another embodiment, includes providing a scan line of image data from the scanned image; determining a current profile of the provided scan line, wherein a profile comprises a plot of scanned gray level versus pixel location on the scan line; storing averages of scanned values from previous scan lines for each pixel location along a scan line to generate an average profile; evaluating the current profile for pulses; for any pulse shape detected in the current profile, comparing the current profile to the average profile; if the current profile is within a predetermined threshold value of the average profile, designating the current profile as a possible streak and recording its location; if a streak profile is repeated for each subsequent scan line of image data for the next N scan lines, a streak has been detected at the location.

The methods described for run-time streak detection can be used to complement run-time streak removal methods described in 20031611-US-NP.

BRIEF DESCRIPTION OF THE DRAWINGS

FIG. 5 is a graph of three profiles for the streak shown in the image segment of FIG. 6; and FIG. 6 illustrates a scanned image with a vertical streak.

DETAILED DESCRIPTION

Figure 1:
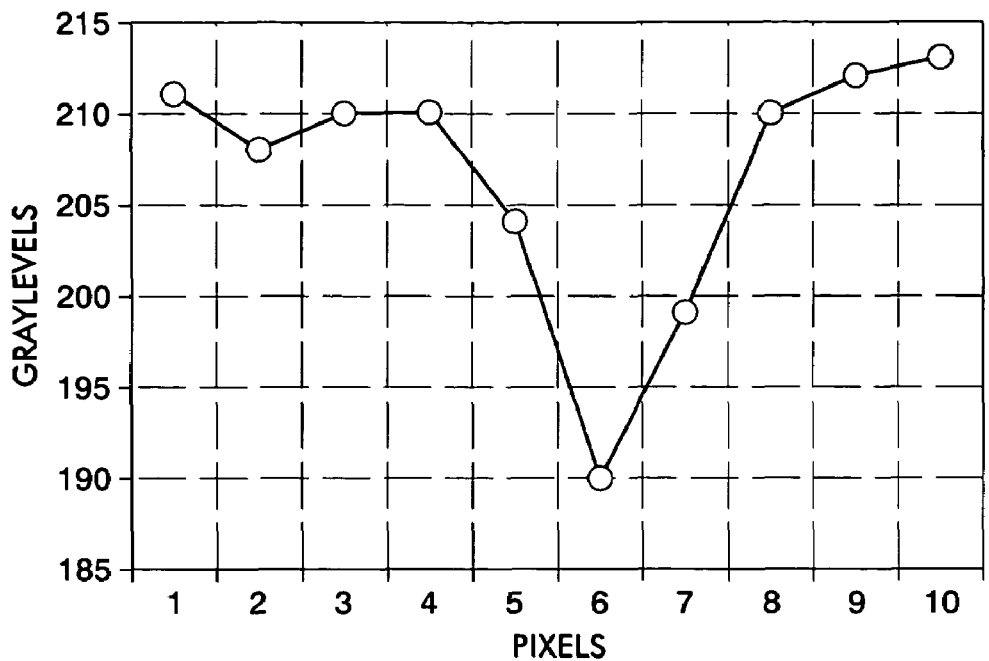
FIG. 1 is a graph of a typical streak profile.

The term profile used herein represents the gray-level outputs across the location of a streak from one scan-line. The profile of a typical streak is shown in FIG. 1, where the profile is shown as a plot of the scanned gray-levels on the vertical axis against the index of pixels on the horizontal axis. From FIG. 1, it can be seen that the streak is about four pixels wide and with a peak value about 20 units below the background. Assume that the value zero is used to represent the complete black and the value 255, the complete white, then the streak described by the profile in FIG. 1 is shown as a thin dark line in a bright background.

Figure 2:
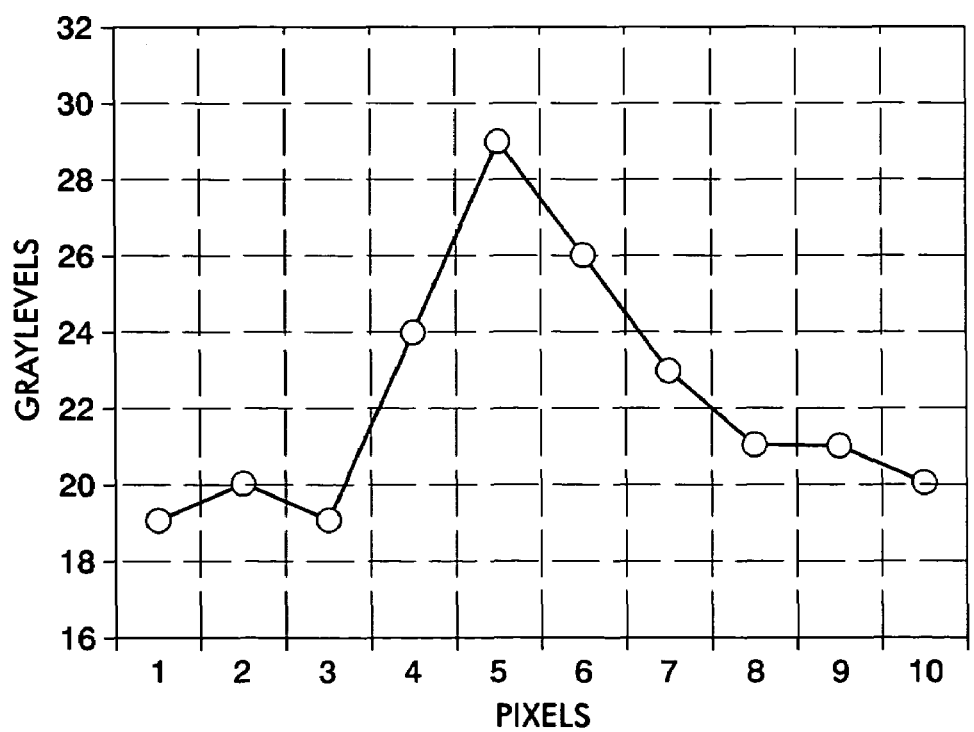
FIG. 2 is a graph of another streak profile.

FIG. 2 is a profile of another typical streak, in this case, the streak is shown as thin, bright line on a dark background. Note that the profile of FIG. 2 is inverted from the profile of FIG. 1.

In general, there is no way to distinguish streaks from other thin lines, which may be a part of the content of scanned documents, from a single streak profile. On the other hand, due to the nature of the cause of streaks, the profile of a streak changes very little from one scan-line to another, as long as the background does not vary much. However, profiles of other thin lines usually change gradually from line to line, because almost none of these lines are perfectly perpendicular to the scan-lines while streaks are generally perpendicular to the scan-lines. Even a small amount of tilt can produce a noticeable change of the profile after a certain number of scan-lines.

Figure 3:
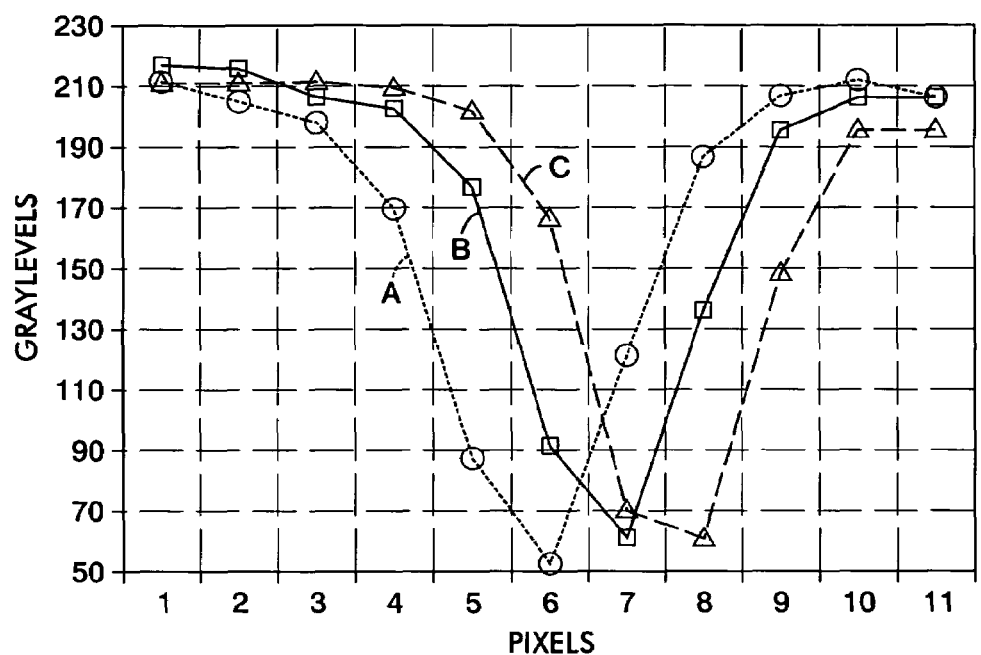
FIG. 3 is a graph of three profiles for the thin vertical line shown in the image segment of FIG. 4.
Figure 4:
FIG. 4 illustrates a scanned image with a thin vertical line as a part of the image content.

FIG. 3 illustrates three profiles of the thin vertical line as part of the image content shown in FIG. 4 for three different scan-line locations. Scan-line A represents the profile generated from the vertical line at the top of FIG. 4; scan-line B represents the profile generated from the vertical line at the middle; and scan-line C represents the profile generated from the vertical line at the bottom of FIG. 4. From the top to the bottom of FIG. 4, there are approximately 200 scan-lines. Comparing the three profiles from A to C, it can be seen that the general shapes of these profiles are substantially the same, however, the locations of the peak values, or the pulses, are different, or shifted, for different scan lines.

FIG. 5 illustrates three profiles of the streak shown in FIG. 6. In FIG. 5, scan-line D represents the profile generated from the streak at the top of FIG. 6; scan-line E represents the profile generated from the streak at the middle; and scan-line F represents the profile generated from the streak at the bottom of FIG. 6. Comparing the profiles from D to F, it can be seen that both the general shapes and the locations of the peak values of these profiles are substantially the same, though the background and the noise varies some.

Streak detection. Based on the profile analysis, the following procedure for streak detection can be used. First, a buffer to store the averages of scanned values from previous scan-lines is provided. A one-pole Infinite Impulse Response (IIR) filter may be used to update the averages for the current (j-th) scan-line, i.e., $$\mathrm{Sum}[i]=(1.0-r)*\mathrm{Sum}[i]+r*\mathrm{Gray}[i];$$

where Sum[i] is the filtered average at i-th pixel, Gray[i] is the current (j-th scan-line) scan value at i-th pixel, r is the coefficient of the IIR filter and usually is chosen to be a small number close to zero.

For each scan-line we determine if the current scan line profile corresponds to the profile of a streak by searching, for example, for profiles with a pulse shape, as shown above for either dark or bright streaks. Among many possible approaches for searching "pulses", we may first detect rising and falling edges by using a minimal signal level, $S_{min}$, then, search any combination of a rising edge followed closely by a falling edge or a falling edge followed closely by a rising edge. The maximal width, $W_{max}$, of potential streaks may be set to a small number of pixels to correspond with the anticipated size of streaks caused by the physical size of the sensors in a particular scanner, say for example from 5 to 10 pixels, according to a statistical study of the size of dirt occurring in CVT scanner.

For any pulse-shape profile detected in the current scan-line, compare it with the profile specified by filtered average Sum[j] on a pixel-by-pixel basis, according to the relationship:

$$\delta = \Sigma abs(\mathrm{Sum}[j][ii]-\mathrm{Gray}[ii])/Wp;$$

where the summation is taken over the width of the profile, Wp.

If the difference δ is smaller than a chosen limit, $\delta_{max}$, mark this profile as a possible streak by recording its location (the middle point of the pulse) and the index of the current scan-line.

If the streak profile is repeated at the same location for the next $N_{min}$ scan-lines, we have enough confidence to conclude that a streak has been detected. The minimal length, $N_{min}$, as the detection threshold, can be set between a few (say 10) to a few hundred pixels. A greater N may reduce the chance to get "false-alarms", but a later decision may increase the chance to miss some short (transitive) streaks and delay the correction needed to remove the detected streaks. Also, counting the minimal length of a streak can be more flexible. Instead of require a perfect continuation, we can allow some "breaks" of a streak due to the noise and/or the change of background.

The method may be implemented using software or hardware, and this flexibility allows a user to calibrate the different settings, including choosing proper parameters, r, $S_{min}$, $W_{max}$, $\delta_{max}$ and $N_{min}$, for an optimal performance in trade-off between detection and false-alarm rate.

To detect and correct a severe streak, which may last for multiple pages, it is possible to carry the detection result from the end of one page to the beginning of the next one. Therefore, no delay is necessary to start the correction as long as the streak profile is detected at the very first scan-line of the new page.

Experiments. A program (software implementation) has been developed for the above described method. Experiments have been conducted to test the program with nearly a hundred scanned images, which included some with real streaks by CVT scanners and some test marks. With calibration of the setting described in the previous section, the experiments have shown that while keeping the false alarm virtually zero we may detect most visible streaks with a less than 200 pixel delay (equivalent to ⅓ inch). The method works well for detecting both dark streaks in bright background and "bright" streaks in dark background. Streaks missed by the detection include some transitive short streaks and some with "busy" backgrounds, such as halftone structures. One calibration result of the experiments is given below:

$r=0.01$; $S_{min}=7$; $W_{max}=10$; $\delta_{max}=8$; and $N_{min}=100$.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for detecting a streak in a scanned image, comprising:

providing a scan line of image data from the scanned image;

determining a current profile of the provided scan line, wherein a profile comprises a plot of scanned gray level versus pixel location on the scan line;

storing averages of scanned values from previous scan lines for each pixel location along a scan line to generate an average profile;

wherein the average profile is determined by the profile specified by filtered average Sum[j];

$\text{Sum}[i]=(1.0-r)*\text{Sum}[i]+r*\text{Gray}[i]$;

where Sum[i] is the filtered average at i-th pixel, Gray[i] is the j-th scan-line scan value at i-th pixel, r is a filter coefficient;

evaluating the current profile for pulses;

for any pulse shape detected in the current profile, comparing the current profile to the average profile; if the current profile is within a predetermined threshold value of the average profile, designating the current profile as a possible streak and recording its location;

if a streak profile is repeated for each subsequent scan line of image data for the next N scan lines, a streak has been detected at the location.

2. The method of claim 1, wherein comparing the current profile to the average profile comprises comparing the current profile with the profile specified by filtered average Sum[j]:

$\delta = \Sigma abs(\text{Sum}[j][ii]-\text{Gray}[ii])/Wp$;

where the summation is taken over the width of the profile, Wp.

3. The method of claim 1, wherein a pulse is determined by detecting rising and falling edges on the current profile.

4. The method of claim 1, further comprising performing a process for streak removal after a streak has been detected.

5. The method of claim 1, further comprising:

comparing the scan line profile to a first predetermined streak profile for a streak, wherein the first predetermined streak profile describes a dark streak on a light background; and comparing the scan line profile to a second predetermined streak profile for a streak, wherein the second predetermined streak profile describes a light streak on a dark background.

* * * * *